United States Patent
Zenere

(10) Patent No.: US 10,507,490 B2
(45) Date of Patent: Dec. 17, 2019

(54) LIGHT-CURING OVEN

(71) Applicant: DWS S.R.L., Zanè (IT)

(72) Inventor: Sergio Zenere, Carrè (IT)

(73) Assignee: DWS S.R.L., Zane (IT)

( * ) Notice: Subject to any disclaimer, the term of this patent is extended or adjusted under 35 U.S.C. 154(b) by 330 days.

(21) Appl. No.: 15/109,904

(22) PCT Filed: Mar. 19, 2015

(86) PCT No.: PCT/IB2015/052032
§ 371 (c)(1),
(2) Date: Jul. 6, 2016

(87) PCT Pub. No.: WO2015/145314
PCT Pub. Date: Oct. 1, 2015

(65) Prior Publication Data
US 2016/0325309 A1    Nov. 10, 2016

(30) Foreign Application Priority Data
Mar. 24, 2014   (IT) .............................. VI2014A0068

(51) Int. Cl.
| B05D 3/06 | (2006.01) |
| B33Y 10/00 | (2015.01) |
| B33Y 30/00 | (2015.01) |

(52) U.S. Cl.
CPC .............. *B05D 3/067* (2013.01); *B33Y 10/00* (2014.12); *B33Y 30/00* (2014.12)

(58) Field of Classification Search
CPC ..... B05D 3/067; B29C 64/30; F27B 17/0016; B33Y 10/00; B33Y 30/00
See application file for complete search history.

(56) References Cited

U.S. PATENT DOCUMENTS 4,446,412 A * 5/1984 Friedman .................. H02P 8/32
                                                             318/685
5,135,686 A   8/1992 Masuhara et al.
(Continued)

FOREIGN PATENT DOCUMENTS

DE   20 2007 004 266 U1   8/2007
EP         1972302 A2     9/2008

OTHER PUBLICATIONS

Taniguchi et al. "Fablication method of an optical lens array using ultraviolet light and ultrasound vibration" 2014 IEEE International Ultrasonics Symposium Proceedings pp. 65-68. (Year: 2014).*
(Continued)

*Primary Examiner* — Robert S Walters, Jr.
(74) *Attorney, Agent, or Firm* — Husch Blackwell LLP

(57) ABSTRACT

A light-curing oven (1; 100) comprising: a light-curing chamber (2) configured to contain one or more objects (A) to be light-cured; a source (3) of light-curing rays arranged inside the light-curing chamber (2); a vacuum pump (4) with a suction duct (5) communicating with the light-curing chamber (2) and a motorized structure (6; 106) for moving the objects (A) during the light-curing process. The motorized structure (6; 106) may comprise an electric motor (7; 107) with a drive shaft (8) mechanically associated with a support plate (9) for supporting the objects (A) to be light-cured. The electric motor (7; 107) and the drive shaft (8) being configured in such a way that they define for the objects (A) a horizontal rotation axis (X). The motorized structure (6; 106) may also comprise piezoelectric transducers (10; 110) for making the objects (A) vibrate during their rotation.

13 Claims, 2 Drawing Sheets

(56) References Cited

U.S. PATENT DOCUMENTS

| | | | | |
|---|---|---|---|---|
| 5,253,580 A | * | 10/1993 | Dee | B41F 15/0872 |
| | | | | 101/40.1 |
| 7,008,483 B2 | * | 3/2006 | Mann | H05K 3/284 |
| | | | | 118/500 |
| 2014/0013719 A1 | | 1/2014 | Trivette | |

OTHER PUBLICATIONS

Endruweit et al. "Curing of Composite Components by Ultraviolet Radiation: A Review" Polymer Composites, 2006, 119-128. (Year: 2006).*
PCT International Search Report, dated Aug. 20, 2015, corresponding to International Application No. PCT/IB2015/052032.
PCT Written Opinion of the International Searching Authority, dated Aug. 20, 2015, corresponding to International Application No. PCT/IB2015/052032.
English translation of DE 20 7 004 266 U1.
English translation of Abstract of EP 1972302 A2.

* cited by examiner

LIGHT-CURING OVEN

The present invention concerns an oven for the light-curing of resins.

In particular, the oven according to the invention is useful for light-curing resins applied to the surfaces of objects manufactured by means of a stereolithographic process.

It is common knowledge that, in order to improve their aesthetic appearance, objects made by means of a stereolithographic process are coated with a layer of light-curable resin that, after the light-curing process, makes the surface of the objects smoother and more homogeneous.

According to the prior art, this treatment involves coating the surface of the objects with a layer of light-curable resin and then treating the objects thus coated inside a light-curing chamber in the presence of a field of light-curing rays delivered, for instance, by one or more lamps emitting ultraviolet radiation. Alternatively, the layer of light-curable resin coating the surface of the objects may also consist of the wetting that spontaneously results from the stereolithographic process used to manufacture the objects.

The light-curing oven also comprises a vacuum pump with a suction mouth communicating with the light-curing chamber, and an electric motor that sets the objects to be treated rotating according to a substantially vertical axis of rotation.

During the treatment, the rotation imposed by the motor on the objects facilitates the homogeneous exposure of all parts of their surface to the action of the ultraviolet rays in order to obtain an optimal light-curing of the resin coating them.

Furthermore, the simultaneous vacuum conditions created inside the light-curing chamber facilitate the extraction of the gases from the resin, making the coating more compact and homogeneous, and improving the light-curing process.

The above-described ovens of the prior art have several acknowledged limitations and drawbacks, however.

A first acknowledged drawback lies in that, because the objects rotate according to a vertical axis of rotation, as they rotate the resin coating the objects tends to drip due to gravity onto the bottom of the treatment chamber and to become thicker towards the lowermost parts of the objects.

This happens, for instance, in apparatuses of the type described in the patent DE 20 2007 004266 U1, in which the objects are set rotating around a vertical axis.

Another acknowledged drawback lies in that degassing makes the resin porous so that it has a silky appearance after the treatment has been completed.

The limitation resulting from this latter acknowledged drawback lies in that using the ovens according to the prior art makes it impossible to obtain glossy surfaces, which can only be achieved by mechanical polishing with abrasives.

Mechanical polishing with abrasives carries another limitation, however, since it cannot be implemented on internal parts of the objects, which are difficult or even impossible to reach.

The known patent US 2014/0013719 A1 describes an oven for curing objects supported on holders set rotating with a movement of "ferris wheel" type, and thus similar to a rotary movement according to a horizontal axis. The treatment does not take place in a vacuum condition, however.

Furthermore, the known U.S. Pat. No. 5,135,686 describes a continuous curing method.

The aim of the present invention is to overcome all the above-listed drawbacks and limitations.

In particular, a first object of the invention is to provide a light-curing oven wherein, during the light-curing treatment, the resin to be light-cured that coats the objects is less liable to drip onto the bottom of the light-curing chamber.

Another object of the invention is to ensure that, during the light-curing treatment, the resin is evenly distributed over the whole surface of the objects. A further, not necessarily last object is to ensure that the oven according to the invention enables objects to be obtained with a smooth and glossy surface.

The above-listed objects are achieved by a light-curing oven with the characteristics described in the main claim to which reference is made below.

Other characteristics of the oven according to the invention and of the light-curing method achievable with said oven are described in the dependent claims.

The oven according to the invention advantageously enables objects to be obtained with surface coatings of a more uniform thickness than those achievable with the known light-curing ovens.

Even more advantageously, objects are obtained that have a glossy surface without the need for any mechanical polishing with abrasives.

Moreover, objects can be obtained that advantageously have glossy surfaces even on the internal parts of the objects that cannot be reached and thus polished using abrasives.

The above-listed objects and advantages will be better illustrated by means of a description of preferred embodiments of the oven according to the invention, which are described with reference to the attached drawings, provided as a non-limiting example, wherein.

Figure 1:
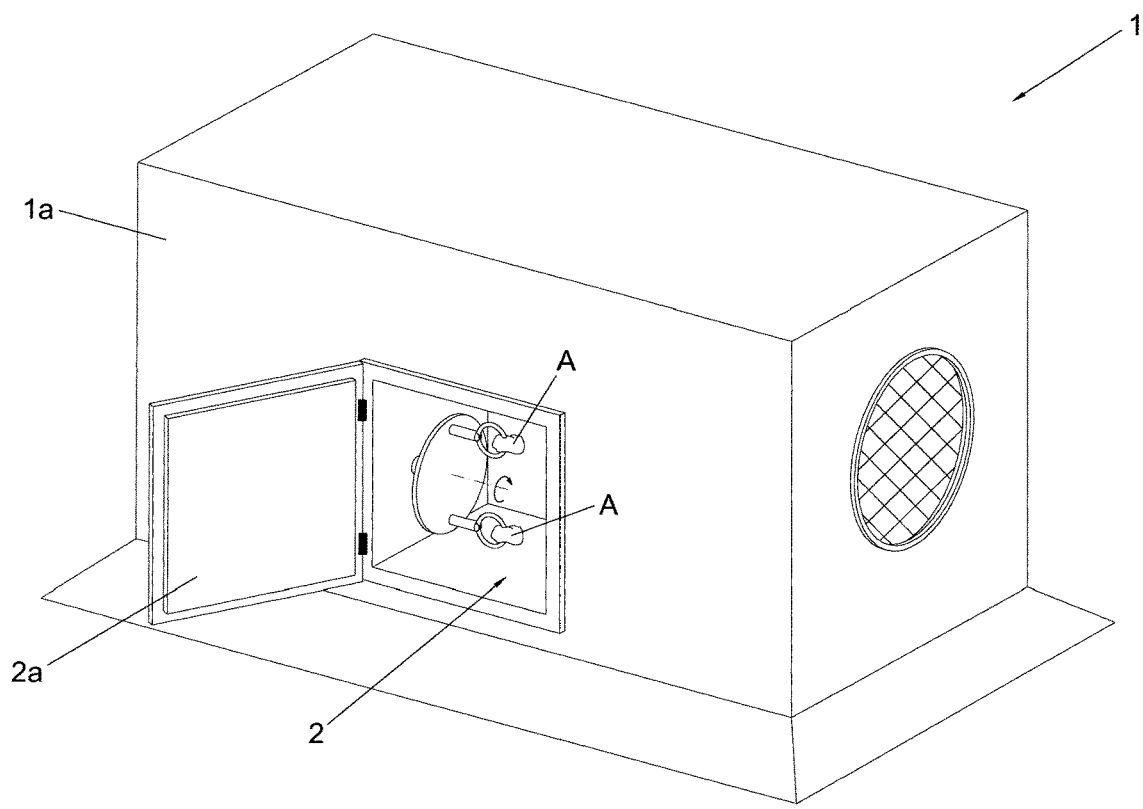
FIG. 1 shows an axonometric view of the oven according to the invention.
Figure 2:
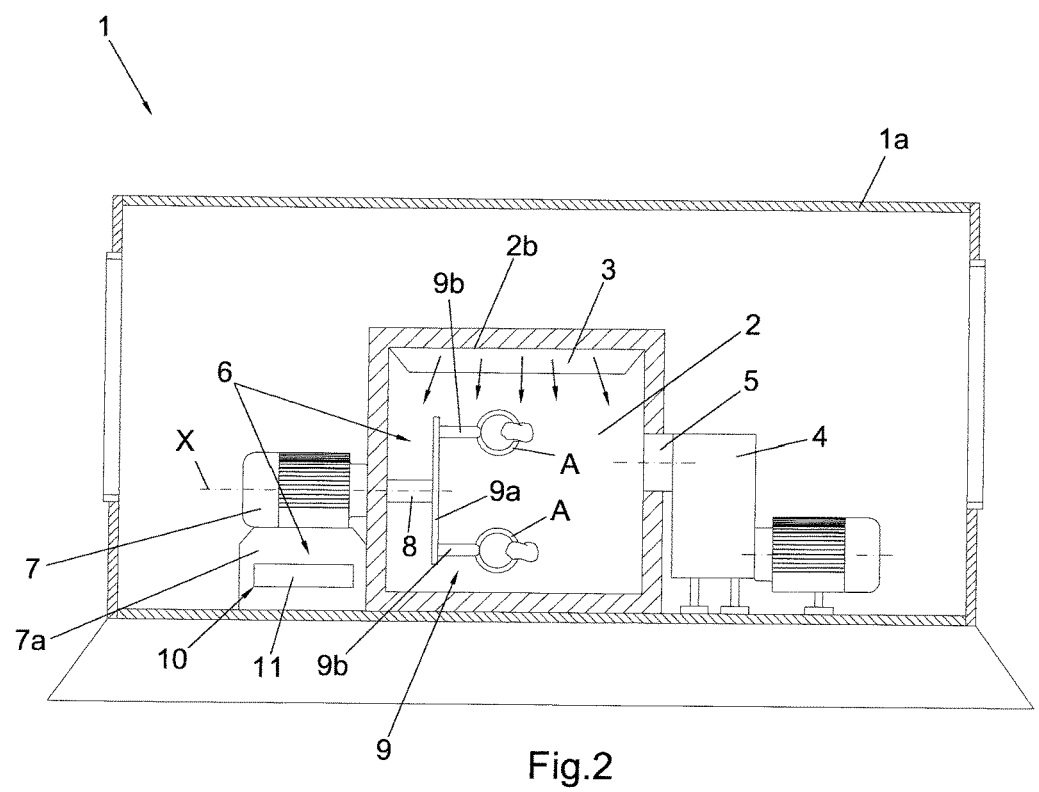
FIGS. 2 and 3 show internal front views of the oven of FIG. 1.
Figure 3:
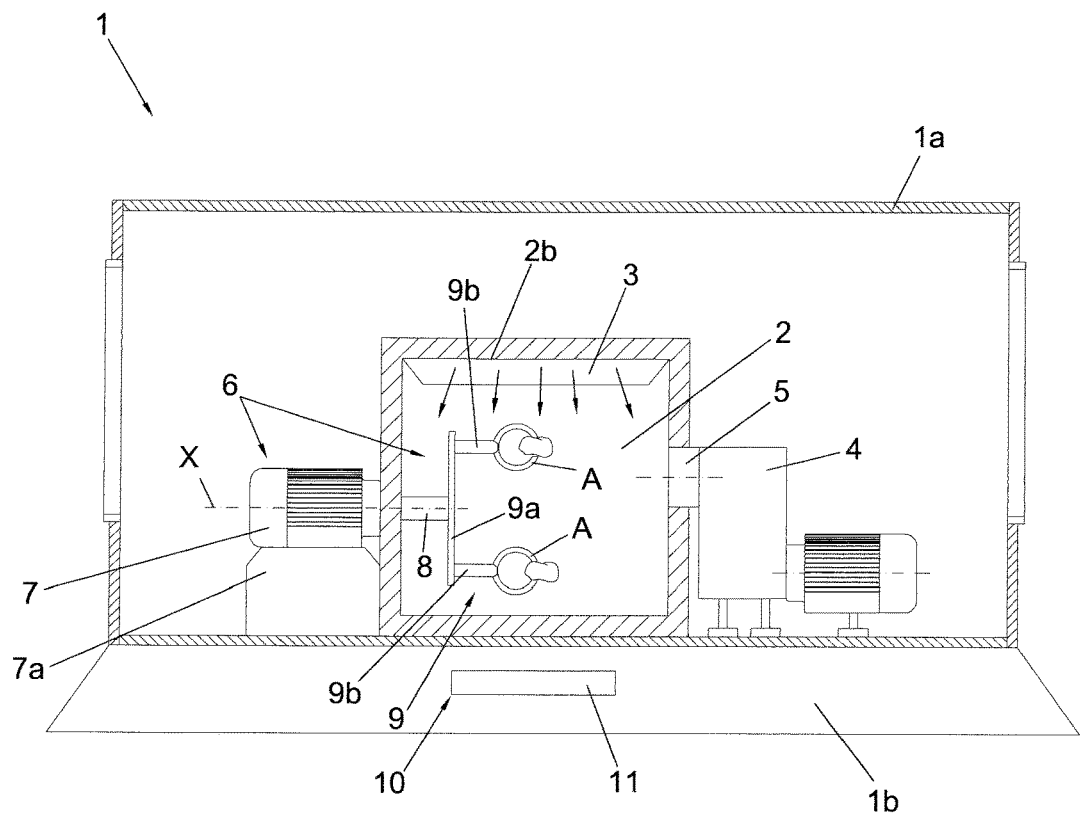

The light-curing oven according to the invention is shown in an axonometric view in FIG. 1, and in internal views in FIG. 2 and FIG. 3, where it is globally indicated by 1.

It can be observed in FIG. 2 that the oven comprises a structure 1a, inside which a light-curing chamber 2 is defined and is provided with a closable hatch 2a, and configured so as to contain one or more objects A coated with a resin to be light-cured.

Inside the light-curing chamber 2, there is a source 3 of light-curing rays that is preferably but not necessarily attached to the ceiling 2b of the light-curing chamber 2 and comprises one or more lamps emitting UV rays, of the type available on the market, for instance.

A light-curing field is therefore created inside the light-curing chamber 2, in which the objects A are immersed.

The structure 1a defining the oven 1 according to the invention is substantially parallelepiped in shape, though in other embodiments it may be of any other shape.

Furthermore, the source 3 of light-curing rays may also be of a different type from the UV lamps available on the market.

The structure 1a contains a vacuum pump 4 with a suction duct 5 communicating with the light-curing chamber 2, and also means 6 for moving the objects A during the light-curing process.

According to the invention, the moving means 6 comprise an electric motor 7 with a drive shaft 8 mechanically associated with means 9 for supporting the objects A to be light-cured, the electric motor 7 and the drive shaft 8 being configured so as to make the objects A turn according to an essentially horizontal axis of rotation X.

The supporting means 9 may vary, depending on the type of objects A to be light-cured.

In the case in point, and merely as an example, it can be observed in FIGS. 1 to 3 that the objects A consist of resin rings and are supported by supporting means 9 comprising a plate 9a coupled to the drive shaft 8 of the electric motor 7 and a plurality of gripping members 9b attached to the plate 9a, each of which supports an object A.

Clearly, the shape and size of the supporting means may vary to suit different types of object, and particularly objects of different shape and size.

Operatively, the oven according to the invention is used to cure the resin coating the surface of the objects A in order to make it smooth and homogeneous.

For this purpose, the surface of the objects A is coated with a light-curable resin applied by spraying or immersion, or using other methods.

Alternatively, as mentioned previously, the layer of light-curable resin coating the surface of the objects may consist of the wetting spontaneously resulting from the stereolithographic process by means of which the objects have been manufactured.

Each object A is placed inside the light-curing chamber, where it is associated with the supporting means 9 and, in this specific case, with each respective gripping member 9b.

Then the hatch 2a of the light-curing chamber 2 is closed, the source 3 of light-curing rays is turned on, and the vacuum pump 4 and electric motor 7 are enabled.

During the rotation around the horizontal axis X, all parts of each object A are exposed for the same amount of time to the light-curing action of the source 3, and this ensures a complete and homogeneous light-curing of the resin on all parts of the surface of the object A.

In addition, the turning speed of the electric motor 7 can be adjusted to a value such that the time taken by each object A to complete half a rotation is less than the time taken by the coating resin to become detached due to gravity, so any dripping of the resin onto the bottom 2b of the light-curing chamber 2 can be avoided, thus achieving one of the objects of the invention.

Finally, the rotation of the objects A according to the horizontal axis X prevents the creation of areas where the resin accumulates, thus achieving another object of the invention, which consists in obtaining light-cured coatings of even thickness.

Because the light-curing treatment takes place in vacuum conditions, the further object of obtaining a surface coating on the objects that is compact and homogeneous is achieved too, as the gases contained therein are released.

The surface obtained is consequently smooth and of uniform thickness, but it has a silky appearance due to the presence of microbubbles created by the gases that emerge spontaneously from the resin during the light-curing process as a result of the negative pressure inside the light-curing chamber 2.

To overcome this drawback and create a glossy surface coating on the objects, it is essential to eliminate the microbubbles that form by continuously compacting the resin coating on the objects A during the light-curing process.

For this purpose, as shown in FIG. 2, the moving means 6 also comprise means 10 for making the objects A vibrate, which consist of one or more piezoelectric transducers 11 of known type available on the market, that are associated with the base 7a of the electric motor 7, or with the base 1b of the structure 1a of the oven 1, as shown in FIG. 3.

The vibration means may also consist of ultrasound generators associated with the base 7a of the electric motor 7, or with the base 1b of the structure 1a of the oven 1.

Figure 4:
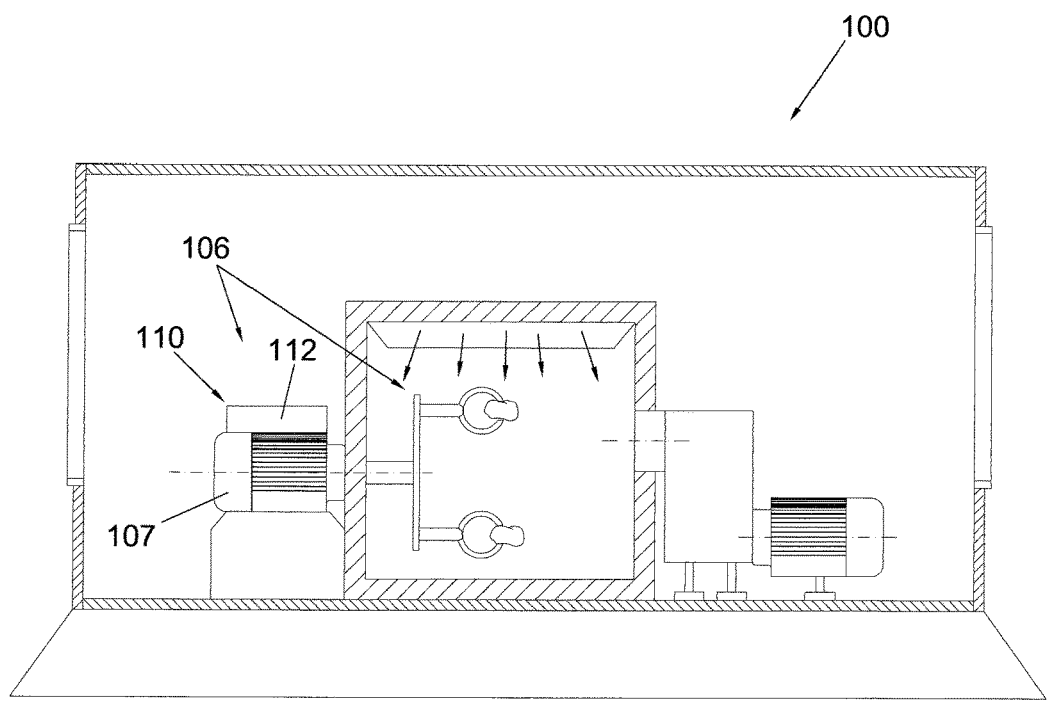
FIG. 4 show an internal front view of another embodiment of the oven according to the invention.

Another embodiment of the oven according to the invention, globally identified by the numeral 100, is shown in FIG. 4 where it can be observed that it clearly differs from the previously-described embodiments in that the moving means 106 comprise an electric motor 107 of step-by-step type and vibration means 110 comprising electronic control means 112 provided with a programmable logic, that are configured to operate the step-by-step motor 107 so as to define a rotary motion.

This rotary motion may comprise a plurality of rotations that are performed all in the same direction of rotation, or said rotary motion may comprise a plurality of rotations that are performed in opposing directions of rotation.

In all the embodiments described, the vibrating motion compacts the resin coating on the objects because it bursts the microbubbles generated by the gases as they emerge spontaneously from the resin due to the vacuum conditions inside the light-curing chamber 2.

As a result, at the end of the light-curing process, the surface of the objects will be glossy, thus achieving another object of the invention.

Combining the vibrating movement of the objects A with their rotation according to the axis X thus enables surface coatings to be achieved that in addition to having a uniform thickness all over the surface of the object and a smooth, compact and uniformly light-cured appearance, they are also glossy, unlike the results achieved by the light-curing ovens according to the prior art.

Objects can thus be obtained with a glossy surface without having to resort to any manual polishing using mechanical abrasive means.

The glossy surface is also obtained on all parts of the objects A, even in the internal parts of the objects that cannot be reached by mechanical polishing means.

The light-curing oven according to the invention substantially enables a light-curing method to be implemented that comprises the following operations:

coating the surface of the objects to be treated with a layer of light-curable resin;

arranging the objects inside a light-curing chamber;

creating a field of light-curing rays inside the light-curing chamber;

creating vacuum inside the light-curing chamber;

setting the objects inside the light-curing chamber rotating according to a substantially horizontal axis of rotation.

The method may also include the simultaneous vibration of the objects.

On the basis of the above description, it is therefore clear that the light-curing oven according to the invention enables the established objects and advantages to be achieved.

Any modifications or variations made to the light-curing oven and to the light-curing method that come within the scope of the attached claims shall be deemed protected by the present patent.

The invention claimed is:

1. A method of light-curing a light-curable resin comprising the steps of:

covering a surface of one or more objects with a layer of said light-curable resin;

positioning said one or more objects to be light-cured in a light-curing chamber of a light curing oven;

directing rays from a source of light-curing rays inside said light-curing chamber;

operating a vacuum pump having at least one suction duct in communication with said light-curing chamber to provide a vacuum therein to expose said layer to said vacuum; and moving said objects during a light-curing process, including operating an electric motor having a drive shaft mechanically associated with a supporting apparatus suited to support said one or more objects to be light-cured, and wherein said electric motor and said drive shaft are configured in such a way that said electric motor and said drive shaft define for said objects a substantially horizontal rotation axis.

2. The light-curing method according to claim 1, wherein said vibrating results from operating a vibrator associated with a base of said electric motor.

3. The light-curing method according to 2, wherein said vibrating comprises operating one or more ultrasound generators.

4. The light-curing method according to claim 1, wherein said oven comprises a base, and including a vibrator associated with the base of said oven.

5. The light-curing method according to 4, wherein said vibrator comprises one or more ultrasound generators.

6. The light-curing method according to claim 1, wherein said electric motor is a step-by-step motor and said vibrating results from operating a vibrator that comprises electronic controls provided with programmable logic that are configured in such a way that the electronic controls operate said step-by-step motor.

7. The light-curing method according to claim 6, wherein said step-by-step motor realizes a plurality of rotations that are all performed in a same direction of rotation.

8. The light-curing method according to claim 6, wherein said step-by-step motor realizes a plurality of rotations that are performed in opposing directions of rotation.

9. The light-curing method according to claim 1, wherein said source of light-curing rays comprises one or more emitters of UV rays.

10. The light-curing method according to claim 1 further comprising closing said light-curing chamber sufficiently tight to hold a vacuum after arranging said object inside said light-curing chamber before creating said vacuum.

11. A method for light-curing light-curable resin laid so as to cover a surface of one or more objects arranged inside a light-curing chamber of a light-curing oven, said method comprising the following steps:

covering the surface of said one or more objects with a layer of said light-curable resin;

arranging said objects inside said light-curing chamber;

creating a field of light-curing rays in said light-curing chamber;

creating a vacuum inside said light-curing chamber to expose said layer to said vacuum; and rotating and vibrating said objects inside said light-curing chamber, wherein said rotation of said objects takes place according to a substantially horizontal rotation axis.

12. The light-curing method according to 1, wherein said vibrating comprises operating one or more piezoelectric transducers.

13. The light-curing method according to claim 11 further comprising closing said light-curing chamber sufficiently tight to hold a vacuum after arranging said objects inside said light-curing chamber before creating said vacuum.

* * * * *